No. 753,635. PATENTED MAR. 1, 1904.
J. SCHERER.
HARROW ATTACHMENT FOR PLOWS.
APPLICATION FILED NOV. 15, 1902.
NO MODEL. 2 SHEETS—SHEET 1.

Witnesses
T. P. Brett
Harry Ellis Chandlee

Inventor
J. Scherer,
By Chandlee & Chandlee
Attorneys

No. 753,635. PATENTED MAR. 1, 1904.
J. SCHERER.
HARROW ATTACHMENT FOR PLOWS.
APPLICATION FILED NOV. 15, 1902.
NO MODEL. 2 SHEETS—SHEET 2.

No. 753,635. Patented March 1, 1904.

UNITED STATES PATENT OFFICE.

JOHN SCHERER, OF ELRENO, OKLAHOMA TERRITORY.

HARROW ATTACHMENT FOR PLOWS.

SPECIFICATION forming part of Letters Patent No. 753,635, dated March 1, 1904.

Application filed November 15, 1902. Serial No. 131,569. (No model.)

*To all whom it may concern:*

Be it known that I, JOHN SCHERER, a citizen of the United States, residing at Elreno, in the county of Canadian, Territory of Oklahoma, have invented certain new and useful Improvements in Harrow Attachments for Plows; and I do hereby declare the following to be a full, clear, and exact description of the invention, such as will enable others skilled in the art to which it appertains to make and use the same.

This invention relates to harrows; and it has for its object to provide a harrow which may be connected to the beam of an ordinary plow for use in connection therewith.

A further object of the invention is to provide a construction which will permit of adjustment of the knives of the harrow to obtain the best results under different conditions and in which the knife-bar, with its knives, may be lowered and raised to move the knives into and out of operable position.

Other objects and advantages of the invention will be seen from the following description.

Figure 1:
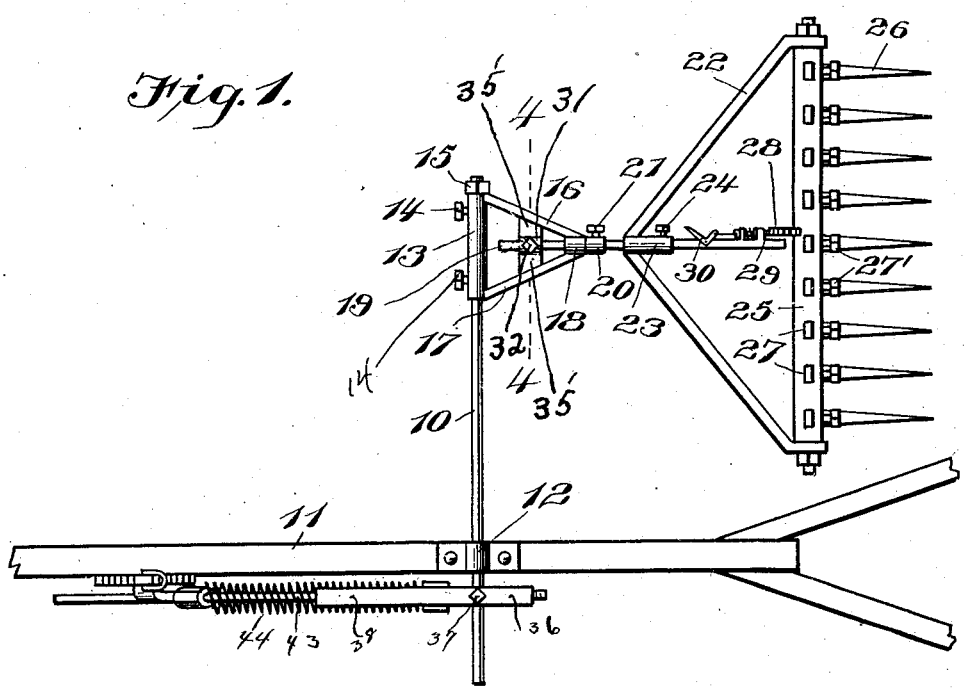
Figure 2:
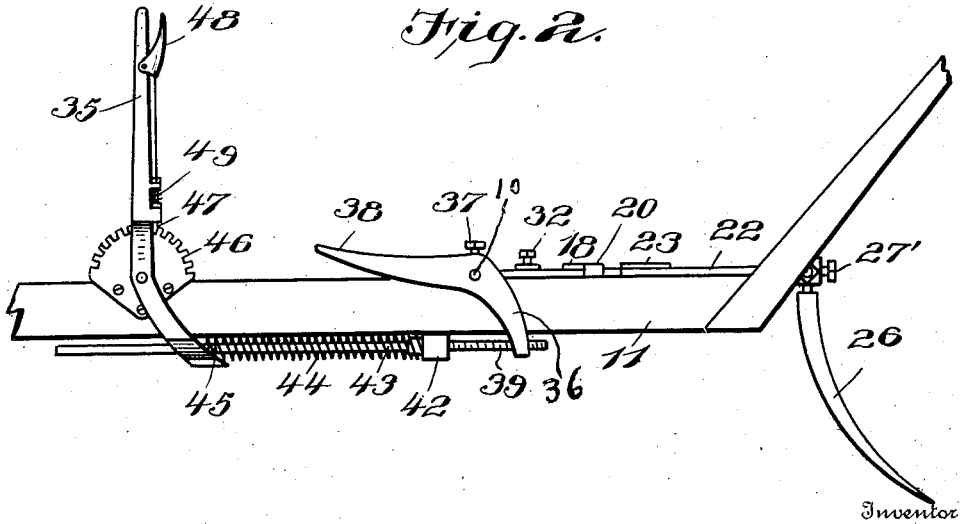
Figure 3:
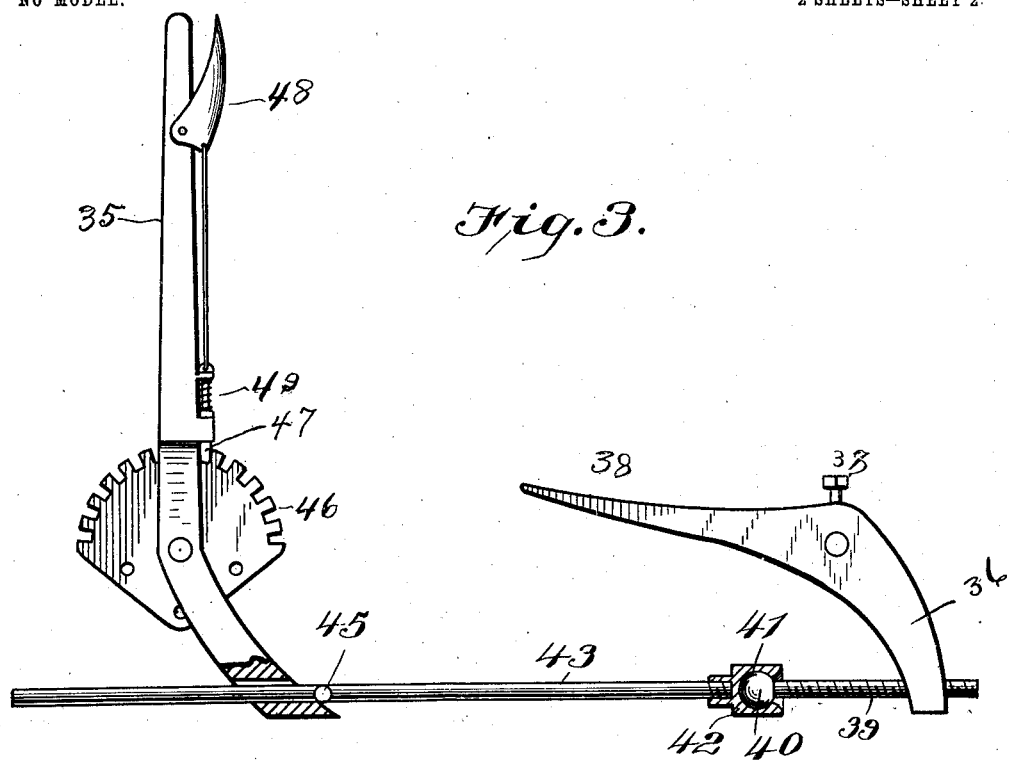
Figure 4:
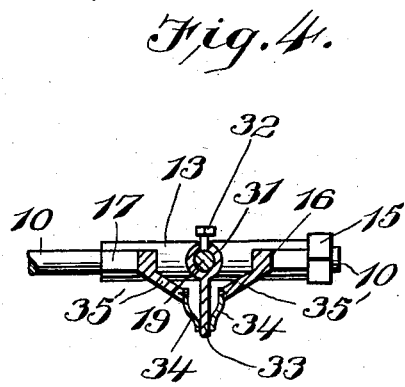

In the drawings forming a portion of this specification and in which like numerals of reference indicate similar parts in the several views, Figure 1 is a top plan view showing a plow equipped with a harrow attachment embodying the present invention. Fig. 2 is a side elevation showing the plow-beam with the harrow attached thereto. Fig. 3 is a detail view showing the foot and hand shift-levers for raising and lowering the harrow, parts of the connecting mechanism being in section. Fig. 4 is a sectional view on line 4 4 of Fig. 1.

Referring now to the drawings, there is shown a harrow comprising a supporting-shaft 10, which in practice is mounted transversely of a plow-beam 11 in bearings 12, provided for that purpose, and in which bearings the shaft is adapted to oscillate. At one end of the shaft, which projects beyond the plow at the furrow side thereof, is mounted a bracket, which may be in the form of a casting and which comprises a sleeve 13, which is held against rotation upon the shaft by means of the set-screws 14, while displacement from the shaft is prevented by the nut 15, which is engaged with the threaded end of the latter. From the sleeve 13 project the rearwardly-converging arms 16 and 17, which unite at their free end portions and have a bearing 18, in which is rotatably received the shaft-like harrow-beam 19, the forward movement of which through its bearing is limited by the collar 20, held adjustably to the harrow-beam by the set-screw 21 for a purpose which will be presently explained.

At the rear end portion of the beam 19 is mounted the harrow proper, consisting of the supporting-arms 22, which diverge rearwardly from the sleeve 23, which is held at the proper point upon the beam 19 and against rotation by means of the set-screw 24. The rear ends of the arms 22 are directed rearwardly and parallel and are perforated to receive rotatably the reduced ends of the bar 25, which carries the knives 26. The upper ends of the knives 26 are reduced and engaged in the openings 27 in the knife-bar, in which they may be adjusted vertically and in which they are held removable by the set-screws 27'. Because of the rotatable engagement of the ends of the knife-bar with the arms 22 the knives 26, which are of arc shape, may be drawn along the ground at any desired angle to the ground within certain limits, and to hold the knife-bar with the knives at the desired angle a notched segment 28 is secured vertically to the knife-bar in position for engagement by the spring-pressed latch 29, which is mounted upon the harrow-beam 19 and is moved from its engaging position by means of a hand-lever 30. In order that the knife-bar may tilt laterally to compensate for uneven surfaces over which the harrow travels, a collar 31 is disposed upon the beam 19 and is held against sliding movement by a set-screw 32, said collar having a depending web 33, which lies between the spring-plates 34, secured to the lugs 35', which depend from the arms 16 and 17. These spring-plates or loose springs press against the web 33 and by holding the web yieldably against lateral movement hold the beam 19 yieldably against tilting and the knife-bar against corresponding movement. As the harrow-beam 19 projects rearwardly from the shaft 10, it will be seen that if said shaft 10 is rotated in one direction the harrow will be raised and if it is rotated in the opposite direction the harrow will be lowered to cause the blades of the harrow to enter the earth. By reason of the arc shape of the blades it will be seen that they will be drawn freely over any trash that would collect upon harrow-spikes.

To operate the shaft 10 to raise and lower the harrow, a hand-lever 35 is employed, which has connections with a second lever 36, which is disposed slidably and rotatably upon the shaft 10 and may be held fixedly at the proper point by means of a set-screw 37, the lever 36 having a foot-piece 38 at its forward end to receive the foot of the driver of the implement, so that said lever may be operated directly and with force to raise the harrow quickly when it is desired. In the opposite end of the lever 36 from the foot-piece 38 is a threaded perforation, through which is engaged the adjusting-screw 39, having a ball 40 at one end, which engages in the socket 41 of a block 42, in which is screwed a rod 43, the opposite end of which is engaged slidably with the lower end of the lever 35, which is, as shown, pivoted upon the plow-beam. Upon the rod 43 is disposed a helical spring 44, attached at one end to the block 42 and at its opposite end to the lever 35, and between the block and the lever and upon the rod is a stop 45. When the hand-lever 35 is moved in one direction, the lower end thereof strikes the stop 45 and moves the rod rearwardly to tilt the shaft 10, as will be understood, the spring being first placed under tension by compression. When the harrow is to be lowered, the hand-lever is moved in the opposite direction. To permit of holding the lever with the harrow raised, a notched segment 46 is fixed upon the plow-beam in position for engagement by the latch 47, which is mounted upon the lever 35 and has a handle 48 for withdrawing it from the notched segment against the influence of a spring 49.

With this construction it will be seen that the harrow proper may be positioned at the desired point longitudinally of the shaft 10, as may be also the lever 36, and that with its use the furrows made by the plow will be successively harrowed while they are yet fresh.

In practice modifications of the specific construction shown may be made, and any suitable materials and proportions may be used for the various parts without departing from the spirit of the invention.

What is claimed is—

1. A harrow attachment for plows comprising a shaft mounted for oscillation, a knife-bar connected to one end of the shaft and having knives, a foot-lever connected with the shaft for tilting it, a hand-lever for operating the said foot-lever and connected thereto by a rod slidably mounted in the lower end of the hand-lever, one end of said rod having a block attached thereto, said block having a socket therein, a second rod screwed into the lower end of the foot-lever, a ball integral with one end of the last-mentioned rod and fitted loosely in the socket of the block, a lug extending from the first-named rod at a point between the hand-lever and the block, and a spring disposed upon the first-named rod, and attached at one end to the block and at its opposite end to the hand-lever, said spring being of such a length that when it is in an inactive position its length will be greater than the distance between the lug and the block.

2. In a harrow, the combination with a supporting-bracket, of a beam rotatably mounted therein, means for holding the beam yieldably against rotation, arms connected to the beam and rotatable therewith, a knife-bar rotatably mounted in the arms and provided with knives, a notched segment carried by the knife-bar, and a latch mounted upon the beam for engagement with the segment to hold the latter with the knives at various angles to the ground.

3. In a harrow, the combination with a supporting-bracket, of a beam rotatably mounted therein, lugs depending inwardly and downwardly from the arms of the bracket, spring-plates attached to and depending inwardly and downwardly from the said lugs, a collar disposed upon the beam and held against sliding movement by a set-screw, said collar having a depending web lying between the spring-plates, arms connected to the beam and rotatable therewith, a knife-bar rotatably mounted in the arms and provided with knives, a notched segment carried by the knife-bar, and a latch mounted on the beam for engagement with the segment to hold the latter with the knives at various angles to the ground.

In testimony whereof I affix my signature in presence of two witnesses.

JOHN SCHERER.

Witnesses:
L. G. FRIBKINS,
W. A. ROBERTS.